United States Patent
Lucas et al.

(10) Patent No.: US 11,377,018 B1
(45) Date of Patent: Jul. 5, 2022

(54) CABLE TRANSPORT

(71) Applicant: Halliburton Energy Services, Inc., Houston, TX (US)

(72) Inventors: Bruce Carl Lucas, Duncan, OK (US); Glenn Howard Weightman, Duncan, OK (US); Timothy Holiman Hunter, Duncan, OK (US); Carlos Vallejo Gordon, Houston, TX (US); Brad Robert Bull, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/149,404

(22) Filed: Jan. 14, 2021

(51) Int. Cl.
*B60P 3/40* (2006.01)
*B65G 67/02* (2006.01)
*B62D 63/06* (2006.01)
*E21B 19/14* (2006.01)

(52) U.S. Cl.
CPC .............. *B60P 3/40* (2013.01); *B62D 63/06* (2013.01); *B65G 67/02* (2013.01); *E21B 19/14* (2013.01)

(58) Field of Classification Search
CPC ......... B65H 57/04; B65G 1/0442; E04B 1/24; E04B 2001/2466; E21B 19/22; E21B 19/084; B65D 85/04
See application file for complete search history.

(56) References Cited

U.S. PATENT DOCUMENTS

| | | | | |
|---|---|---|---|---|
| 3,086,659 | A * | 4/1963 | Cassel | A47F 7/175 |
| | | | | 211/153 |
| 3,157,424 | A * | 11/1964 | Hall | B65G 1/0442 |
| | | | | 211/49.1 |
| 9,009,976 | B2 * | 4/2015 | Seow | H02G 1/00 |
| | | | | 29/897 |
| 10,036,238 | B2 | 7/2018 | Oehring | |
| 2017/0089060 | A1 * | 3/2017 | Harper | E04H 5/02 |
| 2018/0334893 | A1 | 11/2018 | Oehring | |
| 2020/0332511 | A1 * | 10/2020 | Ishaq | E04B 2/58 |
| 2021/0032052 | A1 * | 2/2021 | Lucas | B65G 67/12 |

* cited by examiner

*Primary Examiner* — Kaitlin S Joerger
(74) *Attorney, Agent, or Firm* — Conley Rose, P.C.; Rodney B. Carroll

(57) ABSTRACT

A cable transport system, method, and apparatus are disclosed. In certain embodiments, a cable transport system comprises a cable transport assembly comprising a frame, wherein the frame comprises one or more bottom supports. In certain embodiments, the cable transport assembly comprises a first radii support coupled to a first end of the frame and a second radii support coupled to a second end of the frame, and one or more cables positioned longitudinally on the one or more bottom supports of the frame.

20 Claims, 4 Drawing Sheets

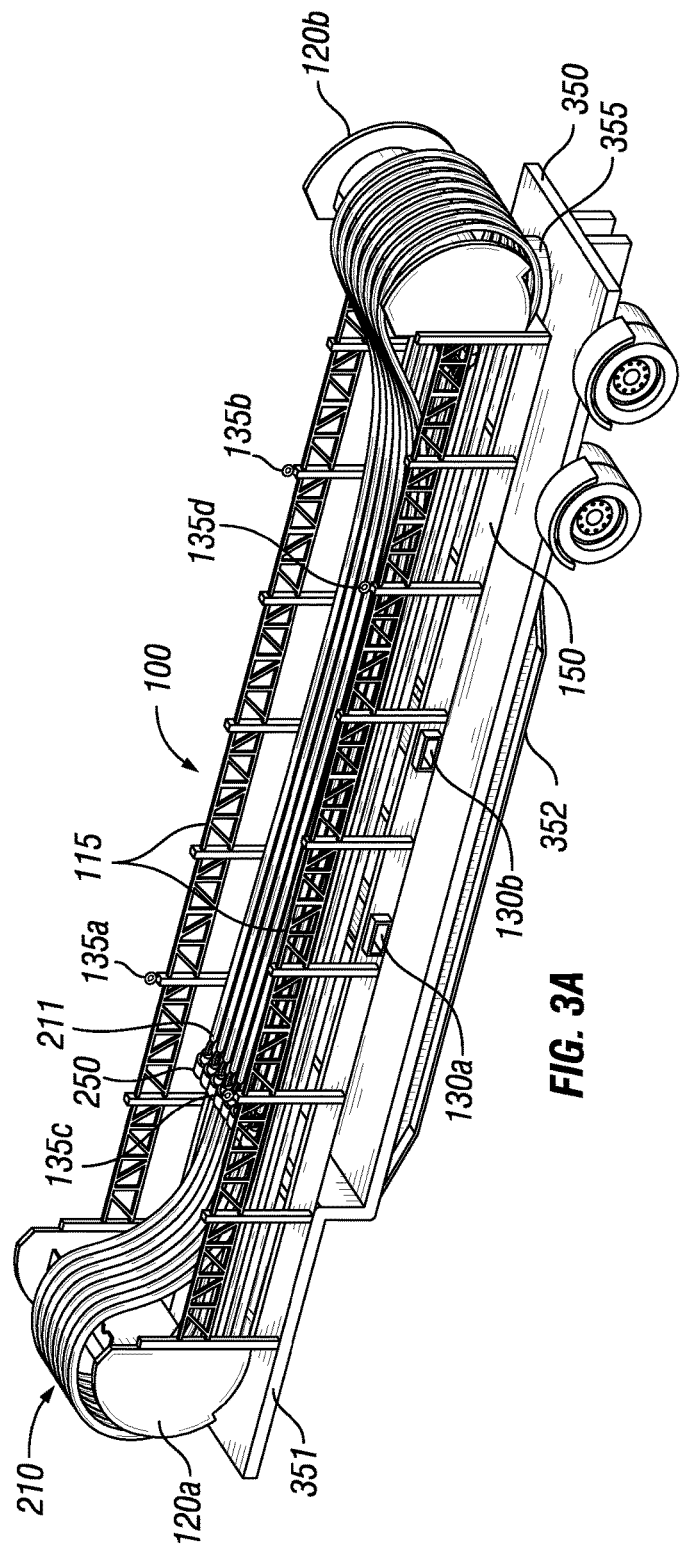
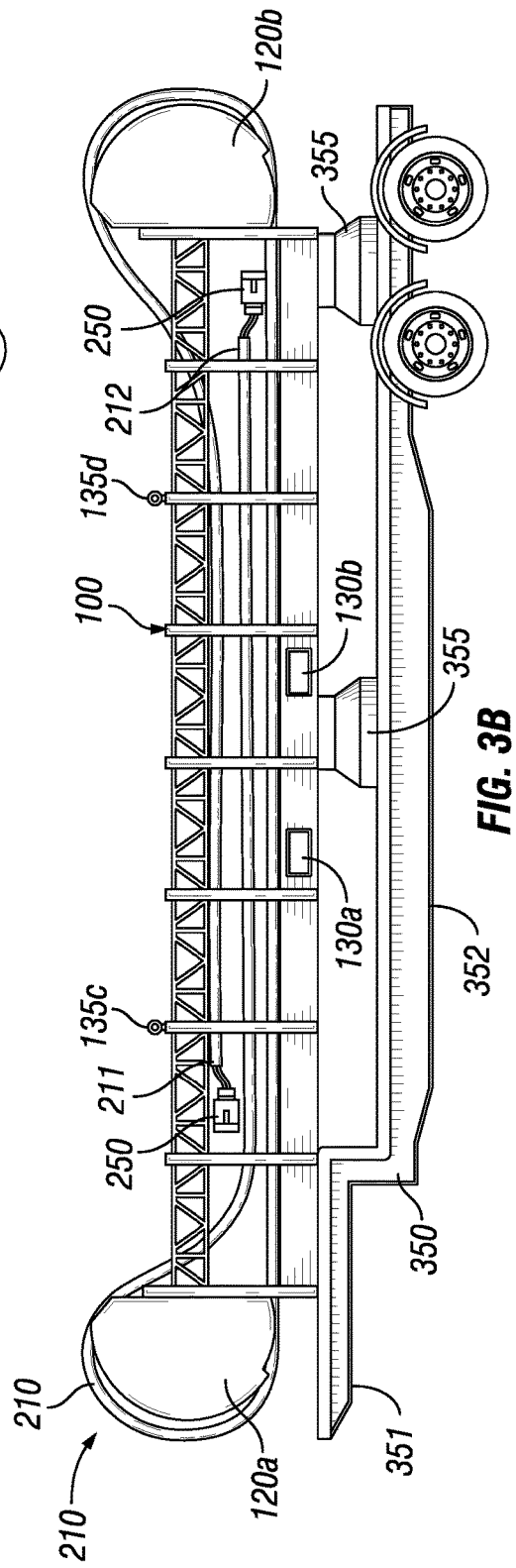
FIG. 3A
FIG. 3B

CABLE TRANSPORT

TECHNICAL FIELD OF THE INVENTION

The present disclosure relates generally to an apparatus, system, and method for storing, transporting, positioning, and distributing cables to equipment to and at a job site, for example, at a wellsite for oil and gas operations.

BACKGROUND

Various types of operations, including drilling, fracking, and other oilfield operations, often require the use of heavy and lengthy power cables and control lines, which can weigh as much as 1000 pounds or more and extend 150 feet or more. Such cabling may be cumbersome to move about a location and may be time consuming and require substantial amount of effort and time from human operators. In certain operations or locations, equipment or devices may be located at a distance from a power source requiring coupling of lengthy lines or cables.

Handling such heavy and lengthy cables over long distances may pose injury hazards to human operators.

Additionally, during travel, loose cables are often stored in coils such that the cables may be easily transported by a large truck or trailer. These cables must be unwrapped or uncoiled once transported to a work site, requiring significant manpower. Often times, loose cables become tangled or otherwise displaced during travel, causing unnecessary delay in installing equipment or devices at a job site, for example, during rig up operations at a well services and production site. Tangled cables also may create significant risk to equipment and personnel if the cables are inadvertently connected to the wrong location. Thus, significant time and manpower are often required to remove the cables from a truck or trailer and carefully arrange the cables to ensure proper connections once at a job site. Then, once the job is complete, the cables must be coiled up and loaded back on to the truck or trailer for the process to be repeated at the next job site.

Protective insulation is often used to protect the cables and prevent electrical shock or injury. However, during travel, the protective insulation of cables may be subjected to harmful impacts such as scraping, repetitive rubbing, or crushing. Additionally, the cables must be handled and stored in such a way that the minimum bend radius of any cable is not exceeded. If the minimum bend radius is exceeded, i.e., the cable is bent too sharply, the protective insulation may separate from the electrical conductor due to dimensional changes of the conductors or some or all of the strands of the conductors may break. Thus, adequate transport capacity and proper storage of cables during transport is desired.

BRIEF DESCRIPTION OF THE DRAWINGS

These drawings illustrate certain aspects of one or more of the embodiments of the present disclosure, and should not be used to limit or define the claims.

FIG. 3A is an isometric view of a cable transport assembly positioned on a drop deck trailer, according to one or more aspects of the present disclosure.

FIG. 3B is a side view of a cable transport assembly positioned on a drop deck trailer, according to one or more aspects of the present disclosure.

DETAILED DESCRIPTION

Figure 1:
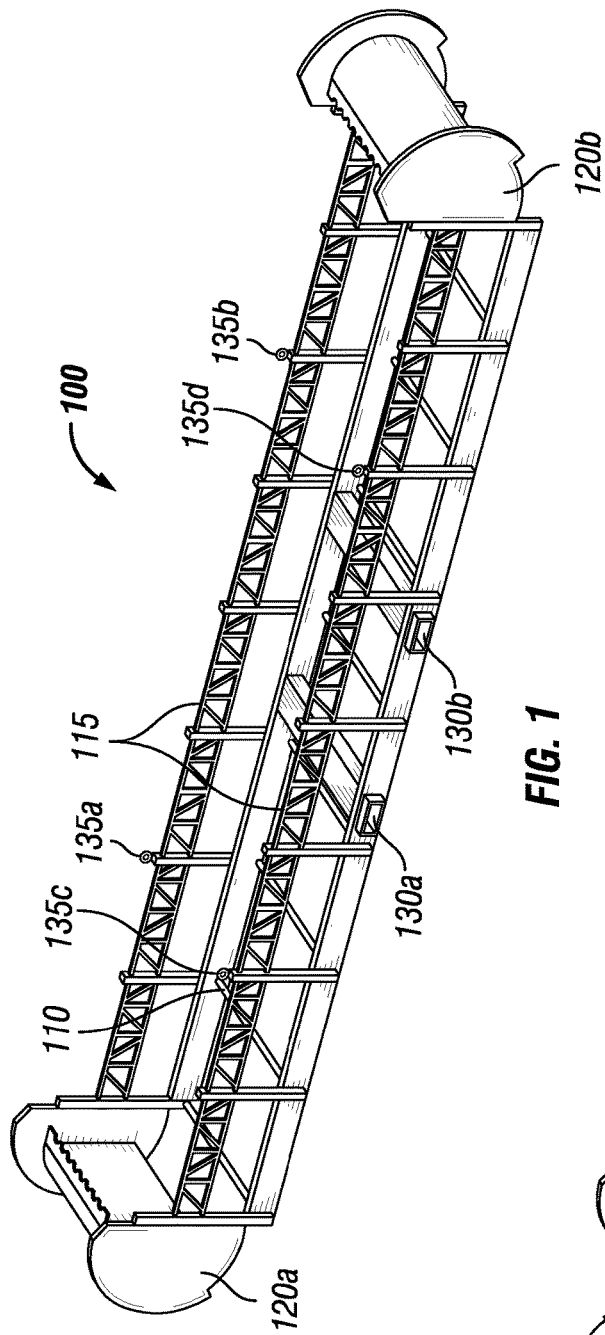
FIG. 1 is an isometric view of a cable transport assembly, according to one or more aspects of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure. The present disclosure relates to a cable transport assembly to provide efficient and safe transport and distribution of power cables and control lines at a location. For example, a cable transport assembly may provide distribution of power or control signals to one or more devices or equipment at a location, such as, to one or more pumps at a well services and production location. While one or more aspects of the present disclosure relate to a cable transport assembly for equipment at well servicing or production locations, the present disclosure contemplates a cabling transport assembly for any type of equipment or at any type of location.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

FIG. 1. depicts an isometric view of a cable transport assembly 100. Cable transport assembly 100 may be comprised of metal or steel. As would be understood by one of ordinary skill in the art, in certain embodiments, other materials may be appropriate so long as the material chosen is adequately durable to support the weight of the cables it is intended for. In certain embodiments, cable transport assembly 100 may be approximately 48 feet long and approximately 8.5 feet wide. However, as would be understood by one of ordinary skill in the art, the dimensions of cable transport assembly 100 may be varied based on one or more factors, e.g., the dimensions of the truck or trailer, the length, size, or rating of the cables, etc. For example, in certain embodiments, cable transport assembly may be from 20 feet long to 100 feet long. In certain embodiments, cable transport assembly 100 may be 4 feet wide to 20 feet wide.

Figure 2A:
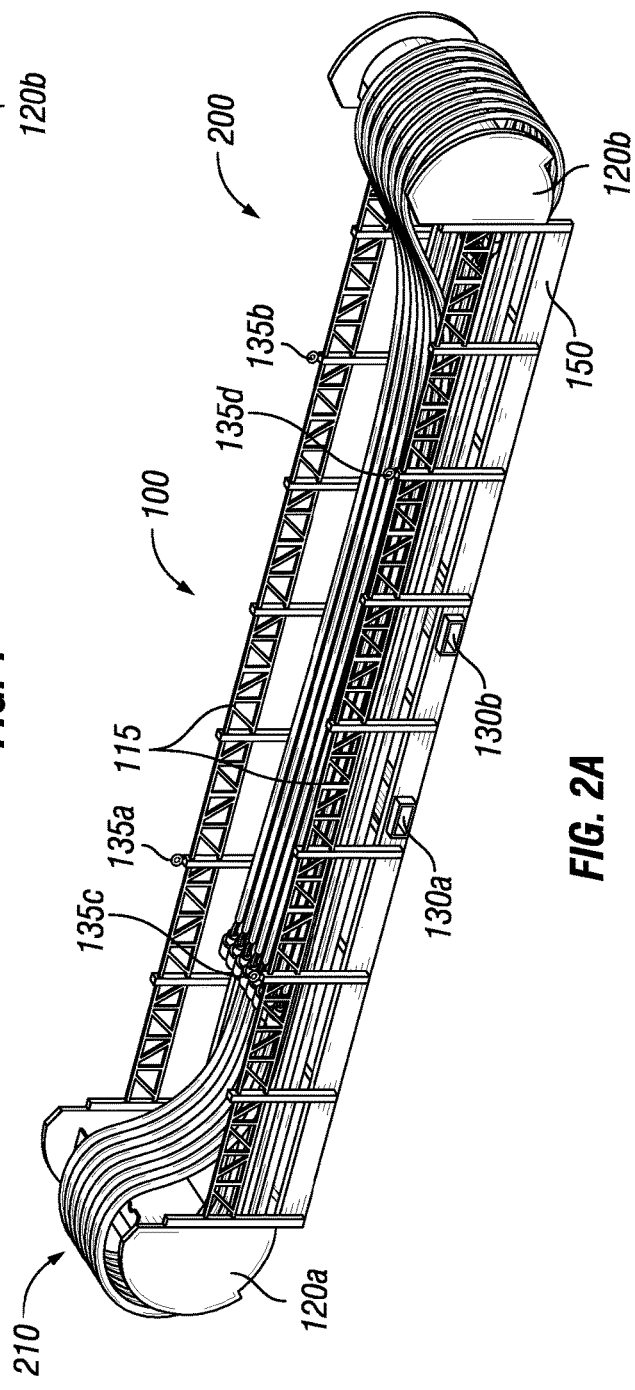
FIG. 2A is an isometric view of a cable transport assembly supporting a plurality of cables, according to one or more aspects of the present disclosure.
Figure 2B:
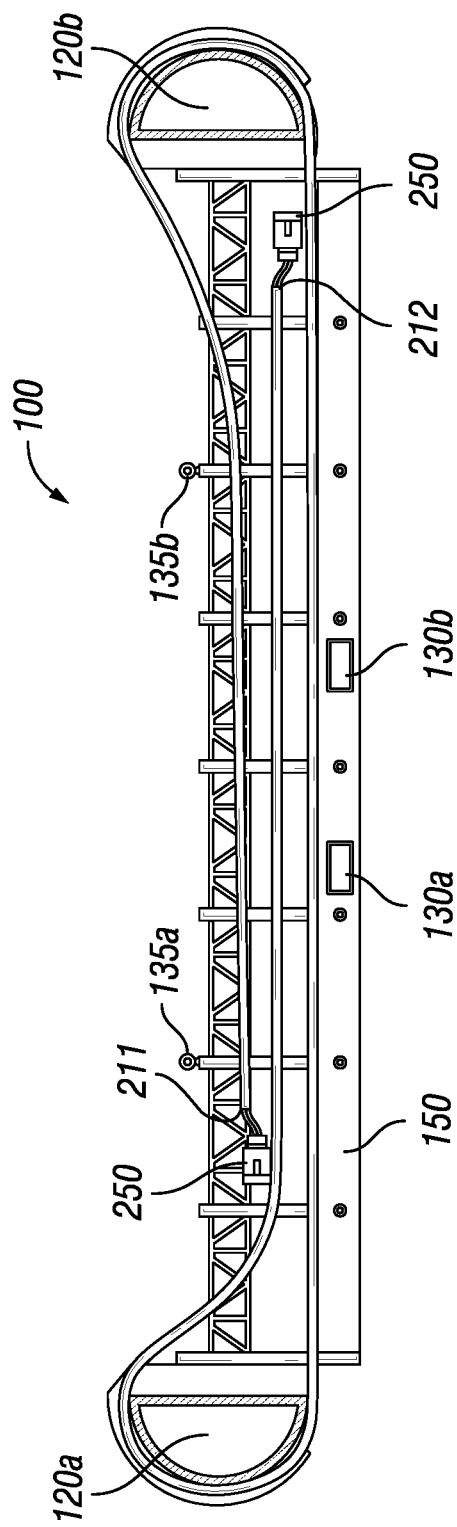
FIG. 2B is a cross-sectional view of a cable transport assembly supporting a plurality of cables, according to one or more aspects of the present disclosure.
Figure 2C:
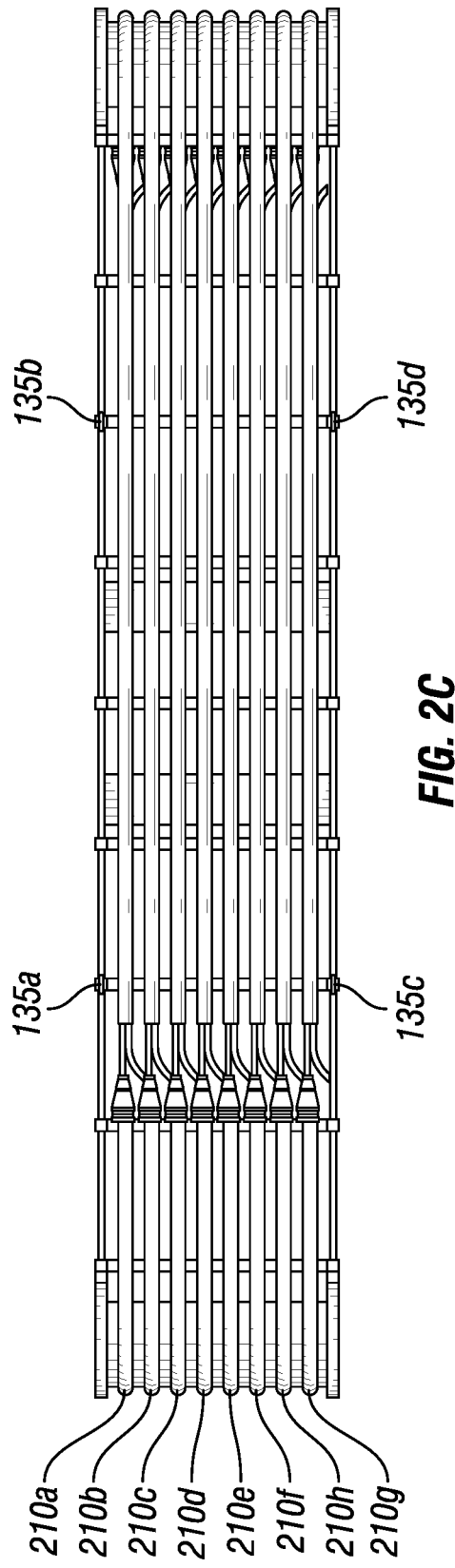
FIG. 2C is a top view of a cable transport assembly supporting a plurality of cables, according to one or more aspects of the present disclosure.

Cable transport assembly 100 may comprise a frame 150. Frame 150 may comprise a one or more bottom or cross supports 110 along the bottom plane of frame 150. For example, frame 150 may comprise a plurality of bottom supports 110. As would be understood by one of ordinary skill in the art, any number of bottom supports 110 may be appropriate in keeping with aspects of the present disclosure. As shown in FIGS. 2A-2C, bottom supports 110 may provide support to one or more cables 201 housed within the cable transport assembly 100, especially when cable transport assembly 100 is being transported. Bottom supports 110 may also facilitate easier placement and lifting of the cables 210 into and from the cable transport assembly 100. Additionally, in certain embodiments, a bottom surface or plane (not shown) may be provided along with bottom supports 110 to provide additional structural support.

Cable transport assembly 100 may further comprise radii supports 120 coupled to each end of the frame 150. For example, cable transport assembly 100 comprises a first radii support 120a and a second radii support 120b. In certain embodiments, one or more radii supports 120 may be attachable and removable from frame 150. For example, radii supports 120 may be attached to frame 150 via washers and hex nuts (not shown), such that no special tooling is required and for allowing quick installation or removal of radii supports 120 from frame 150. As described in more detail below, removing and reattaching radii supports 120 from frame 150 may facilitate easier and more efficient installation of cables 120 on the cable transport assembly 100. In other embodiments, radii supports 120 may be permanently attached, e.g., welded or molded to the frame 150. In certain embodiments, frame 1150 may comprise side supports 115 which provide additional structural support and help keep the cables 210 in the cable transport assembly 100. In certain embodiments, cable transport assembly 100 may not comprise any side supports 115. FIGS. 2A-2C depict a cable transport system 200 with a plurality of cables 210 positioned on a cable transport assembly 100 in a stored position. For example, cables 210 may comprise cables 210a, 210b, 210c, 210d, 210e, 210f, 210g, and 210h. Cables 210 may comprise an armored outer casing made of rubber to protect the electrical wiring within the casing. In certain embodiments, cables 210 may comprise high-density polyethylene (HDPE), metal stranded gauge wire, corrugated metal cladding, or any other types of armored or non-armored cables. As shown more clearly in FIGS. 2A-2B, radii supports 120 may provide curved or rounded edges or transitions for the one or more cables 210 such that the one or more cables 210 are not sharply bent or scratched by the frame 150. As would be understood by one of ordinary skill in the art, in certain embodiments, the dimensions and curvature of radii supports 120 may be varied based on one more factors, e.g., the size or rating of the cables 210.

In order to place the cable transport assembly 100 in a stored position, in certain embodiments, one or more cables 120 may first be positioned laterally along the length of the transport assembly 100, as shown in FIG. 2C. The one or more cables 210 may be positioned such that the midpoint of each cable 210 is roughly positioned at the midpoint between first radii support 120a and second radii support 120b. The one or more cables 210 may be aligned next to one another such that cables 210 are not tangled or intertwined with one another. In certain embodiments, each of the one or more cables 100 may be up to approximately three times the length of the cable transport assembly 100, such that the ⅓ of the length of each of the one or more cables 210 extend past each end of the cable transport assembly 100. For example, in certain embodiments, cables 210 may be approximately 100 feet or more, for example, 120, 150, or 200 feet. As would be understood by one of ordinary skill in the art, varying lengths of cables 210 may be used with the cable transport 100. After the one or more cables 210 are properly aligned, one or more radii supports 120, for example, radii supports 120a and 120b, may then be installed on each end of the frame 150 above the one or more cables 210.

As shown more clearly in FIG. 2B, each cable 210 may comprise a first cable end 211 and a second end 212. In order to store the one or more cables 210 in a stored position on cable assembly 100, cable ends 211 and 212 of each cable 210 may be wrapped or folded over the radii supports and placed at opposite ends of the frame. For example, cable end 211 of a given cable 210 may be wrapped or folded around first radii support 120a and placed near second radii support 120b. Similarly, for example, cable end 212 of the same cable 210 may be wrapped or folded around second radii support 120b and placed near first radii support 120a. The cable ends 211 and 212 may be placed substantially on top of its corresponding cable 210, such that the cable ends 211 and 212 are not tangled or intertwined with other cable ends 211 and 212 of other cables 210. Cable ends 211 and 212 may each further comprise a connector 250. Connectors 250 may comprise circular type connections, high voltage connections, low voltage connections control connections, or any other types of connectors based on the requirements of the specific application (not shown). In certain embodiments, connectors 250 may comprise different types of connections. For example, connector 250 on cable end 211 may be a different type of connection than connector 250 on cable end 212. Connectors 150 may be coupled or connected to one or more pieces of equipment at a job site by an operator. In certain embodiments, connectors 150 may further comprise an indicator (not shown), e.g., a sticker or other marking, indicating a cable bundling, connector type, relative position, or otherwise to where or what piece of equipment the connector 150 is intended to be coupled to. In certain embodiments, cables 210 with identical connectors 150 may be positioned adjacent to one another and bundled together.

Each of the one or more cables 210 may be a cable bundle of one or more cables. For example, cables 210 as shown in the figures may represent one or more cables within an armored casing of the cables 210. In certain embodiments, each cable 210 may comprise, for example, a power cable and a control cable (not shown). As would be understood by one of ordinary skill in the art, in keeping with aspects of the present disclosure, cable transport assembly 100 may be used with various types and sizes of cables 210, for example, three-phase 13.8 kV power cables, medium voltage 480 V cables, and control cables. In certain embodiments, one or more cables 210 may be bundled at or near the ends 211 and 212 of the cables 210 to facilitate more efficient lifting and connecting of the cables 210 (not shown). In certain embodiments, each cable 210 may weigh approximately 1000 pounds. Thus, the one or more cables 210 may be difficult to move by human operators. Thus, in certain embodiments, one or more cables 210 may be lifted at ends 211 and 212 by equipment or machinery, for example, lifting slings (shown in FIG. 4) or other lifting fixtures to facilitate the transport of ends 211 and 212 of the cables 210 with lifting equipment such as cranes, forklifts, or hoists.

As shown in FIGS. 2A-2B, cable transport assembly 100 may further comprise one or more forklift pockets 130, for example, forklift pockets 130a and 130b. For example, forklift pockets 130 may comprise openings running across the width of cable transport assembly 100 for inserting a forklift (not shown) through the cable transport assembly 100 to lift, move, or position the cable transport assembly 100. In certain embodiments, cable transport assembly 100 may comprise one or more lifting eyes 135, for example lifting eyes 135a, 135b, 135c, and 135d, in addition to or instead of forklift pockets 130. Lifting eyes 135 may be positioned along the top edge of side supports 115 such that a crane or other lifting equipment may lift, move, or position the cable transport assembly 100. In certain embodiments where cable transport assembly 100 does not contain any side supports 115, lifting eyes 135 may be positioned elsewhere on frame 150, for example, along the bottom surface of frame 150. As would be understood by one of ordinary skill in the art, other types of lifting mechanisms may be used with the cable transport assembly 100, such that the cable transport assembly 100 may be properly positioned at a job site.

FIG. 3A depicts a cable transport system 300 comprising a cable transport assembly 100 positioned on a drop deck trailer 350 in a stored position. As would be understood by one of ordinary skill in the art, cable transport assembly 100 may be positioned on other types of transport vehicles, e.g., flatbed trailers or trucks, based on the length and size of the transport vehicle. A transport vehicle may be appropriate for transporting and positioning a cable transport assembly at a job site. In certain embodiments, a drop deck trailer 350 may be used to provide for additional length and capacity to support the cable transport assembly 100 and cables 210 over a standard flatbed trailer or truck (not shown). For example, a typical drop deck trailer 350 may be anywhere from 40 to 54 feet long, but should be selected so that the drop deck trailer is at least approximately the same or a greater length than the cable transport assembly 100. As shown more clearly in FIG. 3B, drop deck trailer 350 may further comprise one or more supports 355 for providing a substantially flat surface to support the cable transport assembly 100 across an upper deck portion 351 and a lower deck portion 352. For example, as shown in FIG. 3B, one or more supports 355 may be positioned on the lower deck portion of drop deck trailer 350, such that cable transport assembly 100 lays substantially flat across the upper deck portion 351 and lower deck portion 352. Although two supports 355 are shown in FIG. 3B, as would be understood of ordinary skill in the art, any number of supports 355 may be used for providing a substantially flat surface to support cable transport assembly 100. In certain embodiments, one or more supports 355 may be a sawhorse support. As would be understood by one of ordinary skill in the art, other types of supports 355 may be appropriate so long as supports 355 can support the weight of the cable transport assembly 100 and cables 210. For example, in certain embodiments, an offset frame, lumber, pallets or the like could be used as supports 355.

Additionally, the spaces between supports 335 and below the cable transports assembly 100 may be used to transport other materials on the drop deck trailer 350 or other transport vehicle, such as, drive overs, spare parts, jumper cables, etc.

Figure 4:
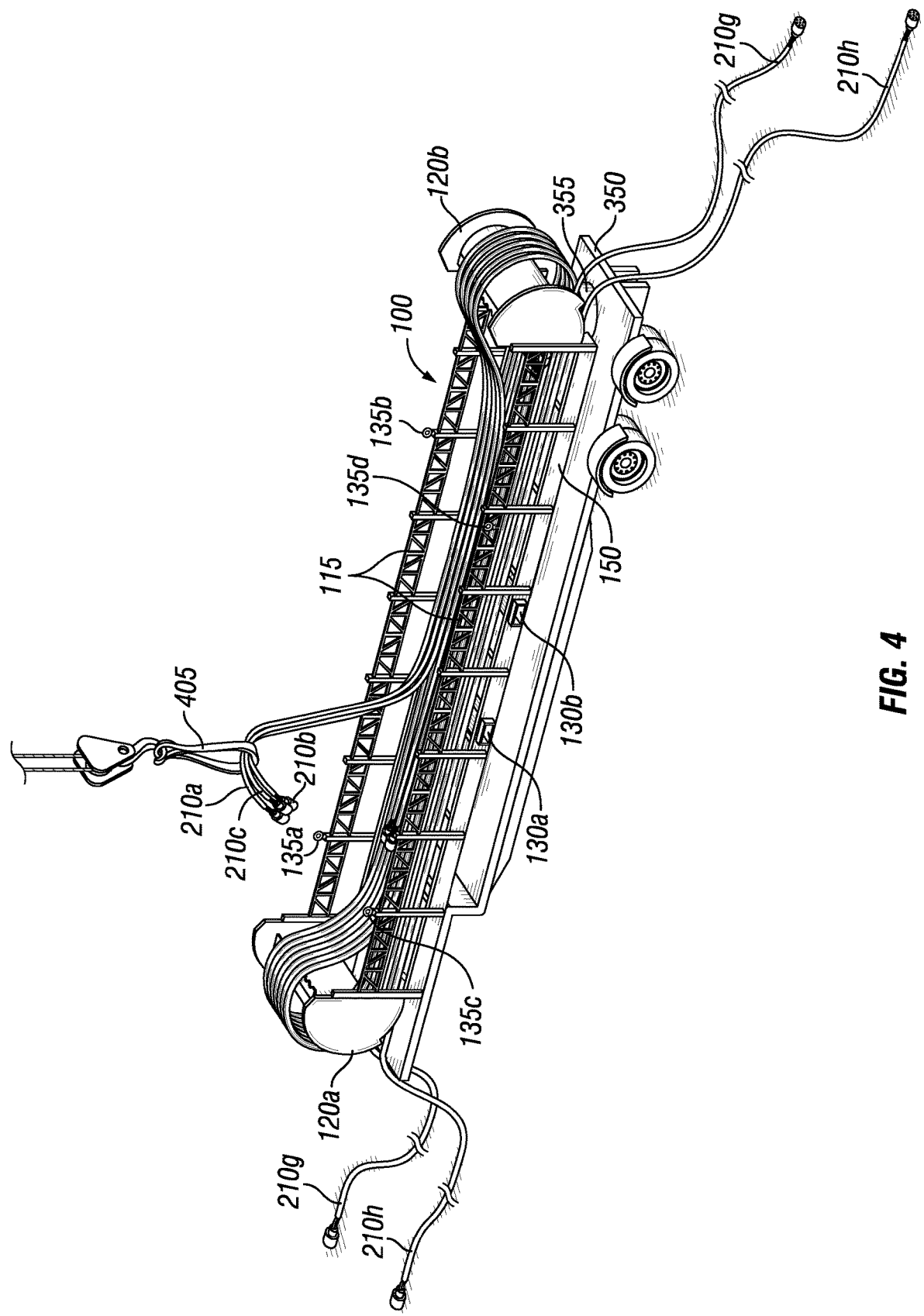
FIG. 4 is an isometric view of a cable transport assembly with a plurality of cables in an operating position, according to one or more aspects of the present disclosure.

FIG. 4 depicts a cable transport system 400 comprising a cable transport assembly 100 positioned on a drop deck trailer 350 in an operating position. As shown in FIG. 4, one or more cables 210, for example, cables 210g and 210h, may be unwrapped around radii supports 120 such that the cables 210 are extended substantially past the ends of cable transport assembly 100. In an operating position, ends 211 and 212 of cables 210 may be operable to couple to one or more pieces of equipment, e.g., a motor, pump, generator, blender, mixer, power distribution unit, switchgear, variable frequency drive, transformer, recloser, or other cable transport units or any other type of equipment. In certain embodiments, cable transport assembly 100 may remain on the drop deck trailer 350 or other transport vehicle in an operating position, such that cable transport assembly 100 can be easily repositioned at a job site. In certain embodiments, space at a job site may be at a premium and it may be desirable to remove the drop deck trailer 350 or other transport vehicle from a job site. Thus, cable transport assembly 100 may be removed from drop deck trailer 350 or other transport vehicle by lifting equipment, e.g., by a forklift or crane as described above, and may be positioned in a fixed location at a job site.

As shown in FIG. 4, a lifting sling 405 may be used to transport one or more cables 210 to and from the cable transport assembly 100. Lifting sling 405 may be attached to a crane (not shown) or other heavy machinery that is suitable for transporting the one or more cables 210. In certain embodiments, lifting sling 4050 may be wrapped around ends 211 and/or 212 of more than one cable 210, for example, cables 210a, 210b, and 210c, such that multiple cables 210 may be transported in one swing, thus optimizing efficiency. In certain embodiments, cables 210, for example, cables 210a, 210b, and 210c, may be selected to be bundled together based on cables 210a, 210b, and 210c having similar or identical connectors 150. The one more cables 210, for example, cables 210a, 210b, and 210c may be positioned at a desired location. Then lifting sling 405 may be removed such that cables 210a, 210b, and 210c may be coupled to the appropriate equipment (not shown).

Thus, the present disclosure provides an improved cable transport assembly for storing, transporting, and distributing cables to and at a job site. The improved cable transport assembly provides an organized method of storing lengthy cables within a frame that may be easily transported by existing machinery on a transport vehicle and between job sites. The present disclosure increases job efficiency by reducing the amount of time required to deploy and retrieve cables. Furthermore, the improved cable transport assembly may better manage and ensure orderly organization of the cables such that the cables are connected to the correct locations by preventing cables from being tangled or intertwined and from being randomly dispersed throughout a job site. Additionally, the improved cable transport assembly may protect cables from being damaged during use and transport. The present disclosure also reduces the manual labor requirement for deploying or otherwise moving the heavy cables. Thus, the cable transport assembly reduces the risk of injuries to personnel who may otherwise be moving the cables or from tripping over loose cables.

A cable transport system, method, and apparatus are disclosed. In certain embodiments, a cable transport system comprises a cable transport assembly comprising a frame, wherein the frame comprises one or more bottom supports. In certain embodiments, the cable transport assembly comprises a first radii support coupled to a first end of the frame and a second radii support coupled to a second end of the frame, and one or more cables positioned longitudinally on the one or more bottom supports of the frame.

In certain embodiments, each of the one or more cables are wrapped around at least one of the first and second radii supports. In certain embodiments, the frame further comprises one or more forklift pockets or lifting eyes. In certain embodiments, the first and second radii supports may be removable from the frame. In certain embodiments, the cable transport system may be positioned on a transport vehicle, and may be removable from the transport vehicle. In certain embodiments, at least one of the one or more cables may be connected to equipment at a job site. In certain embodiments, at least one of the one or more cables may comprise a connector. In certain embodiments, each of the one or more cables comprises a first end and a second end, and the first end of at least one cable may be wrapped around the first radii support and positioned near the second radii support, and the second end of the at least one cable may be wrapped around the second radii support and positioned near the first radii support.

In certain embodiments, a cable transport system comprises a cable transport assembly comprising a frame, wherein the frame comprises one or more bottom supports, and wherein the cable transport assembly further comprises a first radii support coupled to a first end of the frame and a second radii support coupled to a second end of the frame. In certain embodiments, the cable transport system further comprises one or more cables positioned longitudinally on the one or more bottom supports of the frame and a transport vehicle, wherein the cable transport assembly is positioned on the transport vehicle.

In certain embodiments, each of the one or more cables may be wrapped around the radii supports. In one or more embodiments, the transport vehicle is a drop deck trailer, and the cable transport system may comprise one or more supports positioned on a lower deck of the drop deck trailer. In certain embodiments, the one or more cables are connected to equipment at a job site while the cable transport assembly is positioned on the transport vehicle.

In certain embodiments, a method comprises positioning one or more cables adjacent to one another on a cable transport assembly, wherein the cable transport assembly comprises a frame, coupling a first radii support to a first end of the frame and a second radii support to a second end of the frame, and wrapping the one or more cables around the first and second radii supports, such that a first end of at least one cable of the one or more cables is wrapped around a first radii support and a second end of at least one cable of the one or more cables is wrapped around a second radii support.

In certain embodiments, the method may further comprise positioning the cable transport assembly on a transport vehicle. In certain embodiments, the method may further comprise transporting the transport vehicle to a job site. In certain embodiments, the method may further comprise unwrapping the one or more cables from around the first and second radii supports. In certain embodiments, the method may further comprise coupling at least one of the one or more cables to equipment at the job site. In certain embodiments, the method may further comprise, after transporting the transport vehicle to a job site and before unwrapping the one or more cables, removing the cable transport assembly from the transport vehicle. In certain embodiments, the method may further comprise transporting, via a lifting sling, the first end and the second end of at least one cable of the one or more cables from the cable transport assembly to equipment at a job site.

In certain embodiments, the one or more cables wrapped around the first and second radii supports may comprise a stored position of a cable transport system. In certain embodiments, the one or more cables unwrapped from around the first and second radii supports comprises an operating position of a cable transport system. In certain embodiments, the cable transport assembly may comprise one or more forklift pockets or lifting eyes, and the cable transport assembly may be loaded on and unloaded from the transport vehicle using the one or more forklift pockets or lifting eyes.

What is claimed is:

1. A cable transport system comprising:
    a cable transport assembly comprising a frame, wherein the frame comprises one or more bottom supports, and wherein the cable transport assembly further comprises a first radii support coupled to a first end of the frame and a second radii support coupled to a second end of the frame; and
    one or more cables positioned longitudinally on the one or more bottom supports of the frame.

2. The cable transport system of claim 1, wherein at least a portion of each of the one or more cables are wrapped around at least one of the first and second radii supports.

3. The cable transport system of claim 1, wherein the frame further comprises one or more forklift pockets or lifting eyes.

4. The cable transport system of claim 1, wherein the first and second radii supports are removable from the frame.

5. The cable transport of system of claim 1, wherein the cable transport system is positioned on a transport vehicle, and wherein the cable transport assembly is removable from the transport vehicle.

6. The cable transport system of claim 1, wherein at least one of the one or more cables is connected to equipment at a job site.

7. The cable transport system of claim 1, wherein at least one of the one or more cables comprise a connector.

8. The cable transport system of claim 1, wherein each of the one or more cables comprises a first end and a second end, and wherein the first end of at least one cable is wrapped around the first radii support and positioned near the second radii support, and wherein the second end of the at least one cable is wrapped around the second radii support and positioned near the first radii support.

9. A cable transport system comprising:
    a cable transport assembly comprising a frame, wherein the frame comprises one or more bottom supports, and wherein the cable transport assembly further comprises a first radii support coupled to a first end of the frame and a second radii support coupled to a second end of the frame;
    one or more cables positioned longitudinally on the one or more bottom supports of the frame; and
    a transport vehicle, wherein the cable transport assembly is positioned on the transport vehicle.

10. The cable transport system of claim 9, wherein each of the one or more cables are wrapped around the radii supports.

11. The cable transport system of claim 9, wherein the transport vehicle is a drop deck trailer, and further comprising one or more supports positioned on a lower deck of the drop deck trailer.

12. The cable transport system of claim 9, wherein the one or more cables are connected to equipment at a job site while the cable transport assembly is positioned on the transport vehicle.

13. A method comprising:
    positioning one or more cables adjacent to one another on a cable transport assembly, wherein the cable transport assembly comprises a frame;
    coupling a first radii support to a first end of the frame and a second radii support to a second end of the frame; and
    wrapping the one or more cables around the first and second radii supports, such that a first end of at least one cable of the one or more cables is wrapped around a first radii support and a second end of at least one cable of the one or more cables is wrapped around a second radii support.

14. The method of claim 13, further comprising:
positioning the cable transport assembly on a transport vehicle; and
transporting the transport vehicle to a job site.

15. The method of claim 14, further comprising:
unwrapping the one or more cables from around the first and second radii supports; and
coupling at least one of the one or more cables to equipment at the job site.

16. The method of claim 15, further comprising:
after transporting the transport vehicle to a job site and before unwrapping the one or more cables, removing the cable transport assembly from the transport vehicle.

17. The method of claim 16, further comprising:
transporting, via a lifting sling, the first end and the second end of at least one cable of the one or more cables from the cable transport assembly to equipment at a job site.

18. The method of claim 13, wherein the one or more cables wrapped around the first and second radii supports comprises a stored position of a cable transport system.

19. The method of claim 15, wherein the one or more cables unwrapped from around the first and second radii supports comprises an operating position of a cable transport system.

20. The method of claim 16, wherein the cable transport assembly comprises one or more forklift pockets or lifting eyes, and wherein the cable transport assembly is loaded on and unloaded from the transport vehicle using the one or more forklift pockets or lifting eyes.

* * * * *